United States Patent [19]

Leib et al.

[11] Patent Number: 4,936,655
[45] Date of Patent: Jun. 26, 1990

[54] ALIGNMENT FIXTURE FOR AN OPTICAL INSTRUMENT

[75] Inventors: Kenneth G. Leib, Wantagh; Benjamin J. Pernick, Forest Hills; Edward V. Sullivan, Huntington Station; Ronald L. Heuer, Miller Place, all of N.Y.

[73] Assignee: Grumman Aerospace Corporation, Bethpage, N.Y.

[21] Appl. No.: 216,400

[22] Filed: Jul. 7, 1988

[51] Int. Cl.$^5$ .......................... G02B 27/00; G02B 7/00
[52] U.S. Cl. .................................... 350/321; 350/245; 248/178
[58] Field of Search .................... 350/3.6, 162.13, 315, 350/318, 321, 245, 255, 634; 248/178, 179; 269/71, 73, 74; 355/53

[56] References Cited

U.S. PATENT DOCUMENTS

| | | |
|---|---|---|
| 2,493,770 | 1/1950 | Manning . |
| 3,359,849 | 12/1967 | Friedman . |
| 3,428,387 | 2/1969 | Hall et al. .......................... 350/531 |
| 3,433,569 | 3/1969 | Francis . |
| 3,455,026 | 7/1969 | Brault . |
| 3,508,806 | 4/1970 | Hall .................................. 350/531 |
| 3,511,462 | 5/1970 | Dousseau de Bazignan . |
| 3,541,338 | 11/1970 | Duda et al. . |
| 3,572,888 | 9/1969 | Kawashima ........................ 350/531 |
| 3,720,849 | 3/1973 | Bardocz ............................ 350/531 |
| 3,857,643 | 12/1974 | Bardocz ............................ 350/245 |
| 3,989,358 | 11/1976 | Melmoth ............................ 350/247 |
| 4,012,112 | 3/1977 | Masterson ......................... 350/531 |
| 4,013,280 | 3/1977 | Chitayat et al. ....................... 269/71 |
| 4,099,852 | 7/1978 | Kobierecki et al. ................. 350/247 |
| 4,627,009 | 12/1986 | Holmes et al. ..................... 364/559 |
| 4,655,548 | 4/1987 | Jue .................................. 350/634 |
| 4,676,630 | 6/1987 | Matsushita et al. ................. 355/53 |
| 4,676,649 | 6/1987 | Phillips ............................ 355/53 |
| 4,690,507 | 9/1987 | Zimmermann ....................... 350/121 |
| 4,693,600 | 9/1987 | Cross et al. ......................... 356/73 |
| 4,712,851 | 12/1987 | Fusek et al. ........................ 350/3.6 |
| 4,764,791 | 8/1988 | Omata et al. ........................ 355/53 |
| 4,802,758 | 2/1989 | Fabbiani ............................ 350/3.6 |

FOREIGN PATENT DOCUMENTS

0237698 9/1987 European Pat. Off. ............ 248/178

*Primary Examiner*—Bruce Y. Arnold
*Assistant Examiner*—R. D. Shafer
*Attorney, Agent, or Firm*—Scully, Scott, Murphy & Presser

[57] ABSTRACT

An alignment fixture for an optical instrument such as an optical correlator providing for the adjustment of the alignment of an element thereof, such as a matched filter or multiple matched filter or a multiple holographic lens, along at least two transverse x and y axes, and also rotationally $\theta$ in roll about a z axis perpendicular to the transverse x and y axes. The alignment fixture is constructed with a base plate which is designed to be mounted on a stabilized optical bench. The base plate is movable along the z axis for adjustment therealong, and includes a vertically extending frame member. An L-shaped lift angle plate is vertically movably and supported by the vertically extending frame member to provide for alignment adjustments along the y axis. The L-shaped lift angle plate movably mounts a rotational stage in a manner which provides for alignment adjustments along the horizontal x axis. The element being aligned, such as a matched filter, is mounted on the rotational stage with an angular adjustment being provided for $\theta$ roll angular adjustments. Each adjustment is provided by a micrometer drive, preferably a pulse driven motor micrometer controlled by a computer.

6 Claims, 7 Drawing Sheets

ALIGNMENT FIXTURE FOR AN OPTICAL INSTRUMENT

BACKGROUND OF THE INVENTION

1. Field of the Invention

The present invention relates generally to an alignment fixture for an optical instrument such as an optical correlator, providing for the precise adjustment of the alignment of an element of the optical instrument at least along two transverse x and y axes, and also rotationally $\theta$ in roll about a z axis perpendicular to the x and y axes. Moreover, the alignment fixture can also provide for additional alignment adjustments, such as angular adjustments about the x and y axes, and possibly also a translational adjustment along the z axis. More particularly, the subject invention pertains to an alignment fixture as described providing for the precise adjustment and alignment of an element, such as a matched filter or multiple matched filter, in an optical correlator employing such matched filters as its optical memory, or of a multiple holographic Fourier transform lens therein.

The present invention can be particularly used with an Alignment System For An Optical Matched Filter Correlator as disclosed and claimed in U.S. patent application Ser. No. (216399), filed July 7, 1988.

2. Discussion of the Prior Art

A matched filter optical correlation system is disclosed in U.S. patent application Ser. No. 814,209, filed Dec. 27, 1985 now abandon, relative to which the alignment fixture of the present invention was designed and developed. The optical correlation system disclosed therein optically compares an input image with optical information stored in multiple matched filters to provide identification, position, and aspect information about the input image. In one disclosed embodiment, the input image is directed onto a spatial light modulator to spatially modulate a coherent beam of radiation. The spatially modulated radiation beam is directed onto a multiple holographic lens which performs a multiple number of Fourier transformations thereon to obtain an array of a multiple set of Fourier transforms of the spatially modulated radiation beam. A corresponding array of matched filters has the array of Fourier transforms incident thereon, with each matched filter comprising a Fourier transform hologram of a scale or an aspect view of an object of interest. Each matched filter passes an optical correlation signal in dependence upon the degree of correlation of the Fourier transform of the spatially modulated radiation beam with the Fourier transform hologram recorded thereon. An inverse Fourier transform lens receives the optical correlation outputs of the array of matched filters, and performs an inverse Fourier transformation on the optical correlation outputs. A detector detects the inverse Fourier transform of the optical correlation outputs, and produces a detector output signal representative thereof, which is generally maximized as alignments are adjusted in x, y and $\theta$ (rotationally in roll).

One problem with this type of optical correlator is that of obtaining a proper and precise alignment (x, y and $\theta$ rotational) of each individual matched filter with the particular Fourier transform incident thereon. A typical matched filter optical correlator as described hereinabove is normally initially set or adjusted such that, with respect to the matched filter therein, the axial distance along the z axis (optical axis), the $\gamma$ (pitch) adjustment, and the $\beta$ (yaw) adjustment are properly set, and these adjustments generally remain properly set and aligned in particular embodiments of the optical correlator. Accordingly, the initial adjustments of the matched filter with respect to z, $\gamma$ and $\beta$ are normally properly retained by the optical correlator (if the matched filter holder is designed initially with this requirement), and after the initial alignment adjustments, do not require re-adjustment each time a new matched filter is placed therein. However, when a new matched filter is placed in a typical optical correlator, precise adjustments and alignments are normally required along the x axis, the y axis, and the $\theta$ (roll) axis.

SUMMARY OF THE INVENTION

Accordingly, it is a primary object of the present invention to provide an alignment fixture for an optical instrument such as an optical correlator providing for the adjustment of the alignment of an element, such as a matched filter or multiple matched filter or a multiple holographic lens, at least along two transverse x and y axes, and also rotationally $\theta$ in roll about a z axis perpendicular to the transverse x and y axes.

Figure 1:
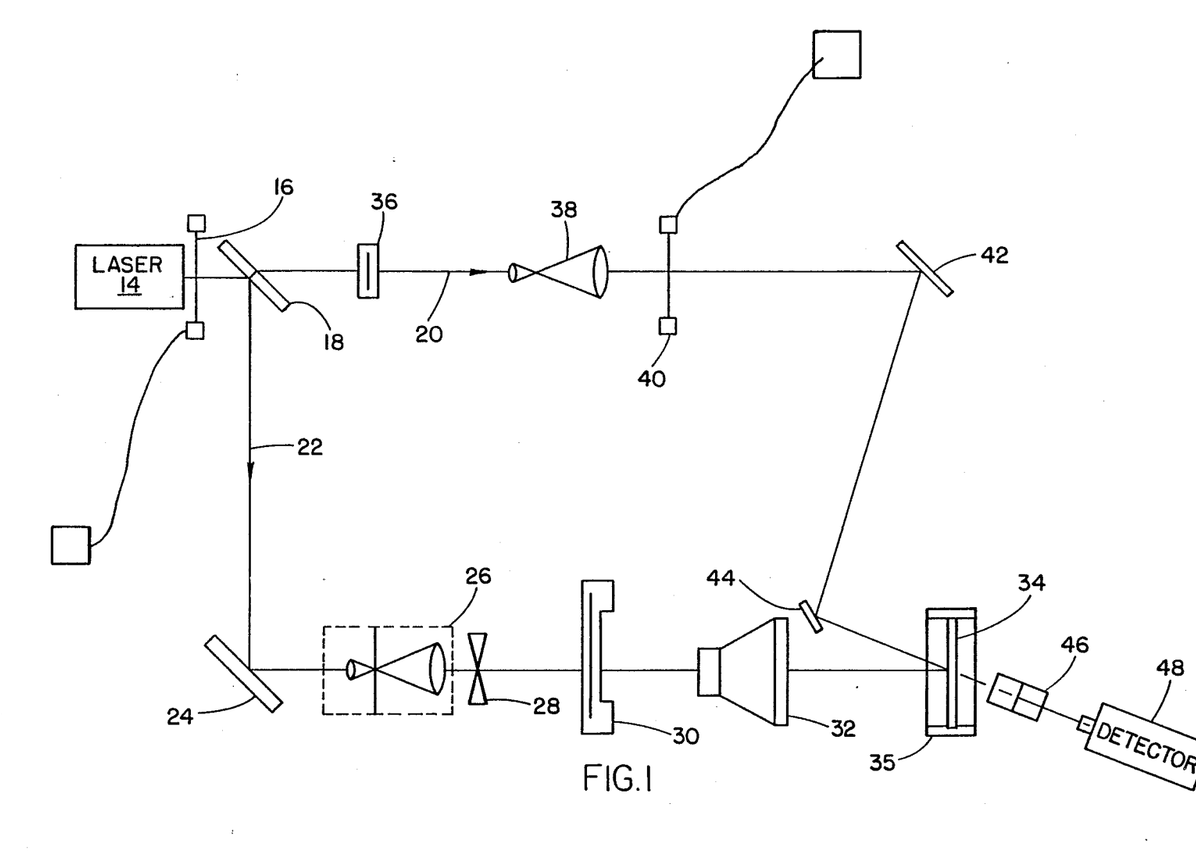
FIG. 1 illustrates a schematic arrangement of an optical correlator as might be utilized in a laboratory environment and employing a matched filter therein as its memory, with the optical correlator also being suitable for fabricating matched filters, and in which the alignment fixture of the present invention can be utilized to properly align a matched filter or other element therein.

The alignment fixture of the present invention aligns an element such as a matched filter relative to an optical correlator such as is illustrated in FIG. 1 herein. The alignment fixture is designed to accurately hold an element such as a photographic plate in position in the optical correlator, and is also designed to accurately align the photographic plate relative to the optical correlator both during the initial fabrication of the matched filter and also later during usage of the matched filter in the optical correlator during correlation functions thereof. Moreover, the alignment fixture can also be used to accurately move the photographic plate, as with stepped incremental movements, during the fabrication of a multiple matched filter when an array of Fourier transform holograms is recorded on a single photographic plate, which requires a precise step and repeat movement pattern during the fabrication. During the fabrication, a mask with an aperture, typically a $\frac{1}{8}''$ diameter circular aperture, is placed in front of the photographic plate to mask portions thereof outside of the aperture, and the mask is incrementally moved in front of the stationary photographic plate.

The alignment fixture of the present invention is constructed from a number of interrelated fixture frame members which are designed for stability while providing for precise alignment adjustments. The optical correlator, with the alignment fixture, is typically mounted on a stabilized optical table to isolate it from vibrations, etc, and can also be mounted on an operational plate. The alignment fixture must be relatively precisely aligned relative to the optical correlator and for that purpose, one or more reference alignment bench rails are provided on the stabilized optical table. The base of the alignment fixture is provided with alignment bosses for proper positioning of the fixture along the z and x axes relative to the alignment bench rails, which provides an initial, but not precise, alignment of the matched filter in the alignment fixture. Once initially positioned, the alignment fixture of the present invention provides for a fine and precise adjustment of the position of the matched filter in the optical correlator.

In accordance with the teachings herein, one embodiment of the present invention provides an alignment fixture as described hereinabove constructed with a slide plate which is mounted on a stabilized optical bench. The slide plate is provided with alignment bosses on the bottom and either side thereof to provide an initial alignment relative to aligning rails provided on top of the optical bench. The top of the base slide plate is provided with several upwardly facing precision V grooves extending along the z axis in which bearing rods are mounted. A base plate is provided with corresponding downwardly facing precision V grooves, such that the base plate is movable thereon along the z axis for adjustment therealong. The base plate includes a vertically extending frame member. An L shaped lift angle plate is vertically movably supported, as by a vertical Lansing translation stage, by the vertically extending frame member to provide for alignment adjustments along the y axis. The L shaped lift angle plate mounts a support base, as by a horizontal Lansing translation stage, which provides for alignment adjustments along the horizontal x axis. The element being aligned such as a matched filter is mounted on the support base by first and second rotational stages which provide angular adjustments for $\beta$ yaw and $\theta$ roll angular adjustments. The slide plate, base plate and L shaped lift angle plate are each preferably fabricated and machined from a single piece of material to form an integral construction without welded or fastened seams therein for additional stability.

In different embodiments herein, an x translational drive system provides for driving the support base for x translational movements relative to the L shaped lift angle plate, and a y translational drive system provides for driving the L shaped lift angle plate for y translational movements relative to the base plate. In a first embodiment of the alignment fixture, the x translational and y translational support systems are provided by commercially available Lansing translation stage, while in a second embodiment the x translational and y translational support systems are provided by incorporating commercially available Schneeburger recirculating bearing assemblies in the design. A $\theta$ rotational drive system is also provided for driving the element for $\theta$ rotational movements about a z axis, perpendicular to the x and y axes, relative to the support base.

Additional alignments, although not common, can be provided by a z translational drive system for driving the base plate relative to the slide plate for z translational movements, and a $\beta$ yaw rotational drive for driving the object for $\beta$ yaw rotational movements about the y axis.

In a preferred embodiment, the x translational drive system, the y translational drive system, and the $\theta$ rotational drive system are each preferably formed by a pulse driven motor micrometer, and a computer control system supplies driving pulses to each pulse driven motor micrometer.

BRIEF DESCRIPTION OF THE DRAWINGS

The foregoing objects and advantages of the present invention for an alignment fixture for an optical instrument may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Referring to the drawings in detail, FIG. 1 illustrates a schematic arrangement of an optical correlator as might be used in a laboratory environment, and which is also suitable for fabricating matched filters. The optical correlator includes both a signal channel and a reference channel. The latter is used to construct matched filters of targets of interest, and is thereafter removed from use by a reference beam shutter 40 which is closed. In FIG. 1, a laser source 14 generates and directs a laser beam through a shutter exposure control gate 16 onto a beam splitter 18 which divides the laser beam into a reference beam 20 and a signal beam 22.

The signal beam 22 is reflected from a mirror 24 through a pinhole/collimator 26 and an iris field stop 28 through a film gate 30. During usage of the optical correlator, a photographic image of a target of interest is positioned in the film gate 30 and spatially modulates the signal beam with the image. The signal beam with the spatially modulated image of interest passes through a Fourier transform lens 32 which takes the Fourier transform of the spatially modulated beam and directs it onto a matched filter element 34 which is mounted in the alignment fixture 35 of the present invention.

The reference beam 20 passing through the beam splitter 18 passes through a control liquid gate 36 through a pinhole/collimator 38, through a reference beam exposure control shutter 40, from which it is redirected by mirrors 42, 44 onto the matched filter element 34.

When the arrangement of FIG. 1 is utilized to fabricate a matched filter, a photographic film image of a target of interest is introduced into film gate 30, and an unexposed film plate is placed at the matched filter 34, and is properly positioned there at by the alignment fixture of the present invention. The system is then turned on for a given exposure time during which the Fourier transform of the image of interest is interfered with the reference beam at the matched filter, which records a hologram of the Fourier transform image of interest thereon.

When the arrangement of FIG. 1 is utilized in a correlation function, a matched filter having a hologram recorded thereon of a target image of interest is placed at matched filter 34 in the alignment fixture 35 of the present invention and properly aligned therein. An image on a photographic film which is to be analyzed for the presence therein of the image of interest is placed in the film gate 30. Alternatively, in other correlator embodiments an image of an object or scene of interest can be directed through a spatial light modulator to produce a spatially modulated light beam to be analyzed. The use of a spatial light modulator (SLM) in the correlator, instead of the direct usage of a film, is an adaptation for use in such applications as robotics which generally requires an SLM-like, image storing device. The optical output signal from the matched filter is passed through an inverse Fourier transform lens 46 onto a suitable optical detector 48, all in a manner as disclosed and taught in greater detail in U.S. patent application Ser. No. 814,209, filed Dec. 27, 1985 now abandon. A typical output from an optical correlator when viewed on a TV camera-monitor combination yields a bright spot representing an auto-correlation of an input image with the Fourier transform hologram stored in a matched filter.

Matched filters are made by exposing a recording medium to an interference pattern in a manner as described, and then developing the exposed medium with the recorded hologram thereon. Because very little space is required on a matched filter to store a hologram, it is possible to construct a multiple matched filter having a large array of holograms recorded thereon, and, for example, a 50 mm×50 mm matched filter plate can be fabricated with a 100×100 array of holograms thereon.

Such a multiple matched filter may be fabricated by using a multiple beam generating holographic lens to generate an array of beams, and directing each of these beams toward a different area on a recording medium to produce an array of diffraction patterns thereon. Such a filter may be employed in an optical correlator system by using a similar or identical holographic lens to generate an array of beams, and directing each of these beams to a different hologram on the multiple matched filter.

Alternatively, a multiple matched filter can be constructed by using an alignment fixture as disclosed herein to accurately move a photographic plate, as with stepped incremental movements, during the fabrication of a multiple matched filter when an array of Fourier transform holograms is recorded on a single photographic plate, which requires a precise step and repeat movement pattern. During the fabrication a mask with an aperture, typically a ⅛" diameter circular aperture, is placed in front of the photographic plate to mask portions thereof outside of the aperture, and the mask is incrementally moved in front of the stationary photographic plate.

To operate the correlator system effectively, it is extremely important that the multiple matched filter be located, with a very high degree of precision, in a specific position relative to the multiple beam generating holographic lens. Not only is the distance between these two elements critical, but their relative angular orientations and their relative lateral placements are also very important. For instance, the correlator system may be ineffective if the matched filter is laterally displaced only 50 to 100 microns away from its correct precise position relative to the multiple beam generating lens.

The correct relative positions of the matched filter and the multiple beam generating lens in the correlator system depends on the position of the recording medium from which the filter was made relative to the multiple beam generating lens used to form the array of diffraction patterns on that recording medium. Because of this, in order to use the matched filter properly in the correlator system, it is also extremely important that the recording medium from which that filter was made be positioned very accurately relative to the multiple beam lens during the fabrication of the matched filter. Moreover, the matched filter in an optical correlator is often changed, and each new matched filter must be precisely positioned and aligned in the correlator.

Holographic systems are known that, with a relatively few adjustments in the components of the system, may be operated both to make a matched filter on a photographic plate, and also as an optical correlator using that filter, and wherein the correct position of the matched filter in the system, when it is used as a correlator, is identical to the position of the photographic plate from which that matched filter was made. Such systems substantially facilitate determining the correct position of the matched filter. However, even with these systems, it is still very important to precisely position the photographic plate in the system, remove it, develop it, and then precisely position the developed matched filter back in the correlator system.

Achieving this very high degree of precision in holographic recording and optical correlator systems is very difficult and time consuming for several reasons. For instance, in these systems the necessary placement and adjustment of the recording medium, the matched filter, and the multiple beam generating holographic lens are normally done either in the dark or in very low levels of light to minimize any undesirable exposure of the recording medium or the matched filter. Moreover, holographic recording mediums and matched filters usually include glass plate backings that often have rough outside edges, and these rough edges may cause the plates to tilt slightly if they are seated against edges of conventional frames or flat support surfaces. While this tilt may be very slight, it can produce a very undesirable deviation in the position of a holographic element.

The particular embodiments of the subject invention disclosed and described herein are designed to handle 2"×2"×0.040" photographic plates, but are capable of being scaled to meet the requirements of any other size of type of photographic plate. In addition, the use of a frame to hold the photographic plate as described in U.S. patent application Ser. No. 903,275, filed Sept. 3, 1986 now U.S. Pat. No. 4802718, can also be provided.

The alignment fixture of the present invention is used:
(1) to hold the plate with stability in position;
(2) to accurately align the plate for matched filter construction;
(3) to accurately move the plate in a prescribed manner during construction, if required, as during fabrication of a multiple matched filter;
(4) to precisely align the plate after the matched filter is made to be used in actual correlation measurements in the optical correlator;
(5) to align a replacement matched filter.

The alignment fixture of the present invention could also serve quite effectively for holding and aligning a multiple holographic lens plate in an optical correlator during operation of the correlator or fabrication of the multiple holographic lens plate.

Figure 2:
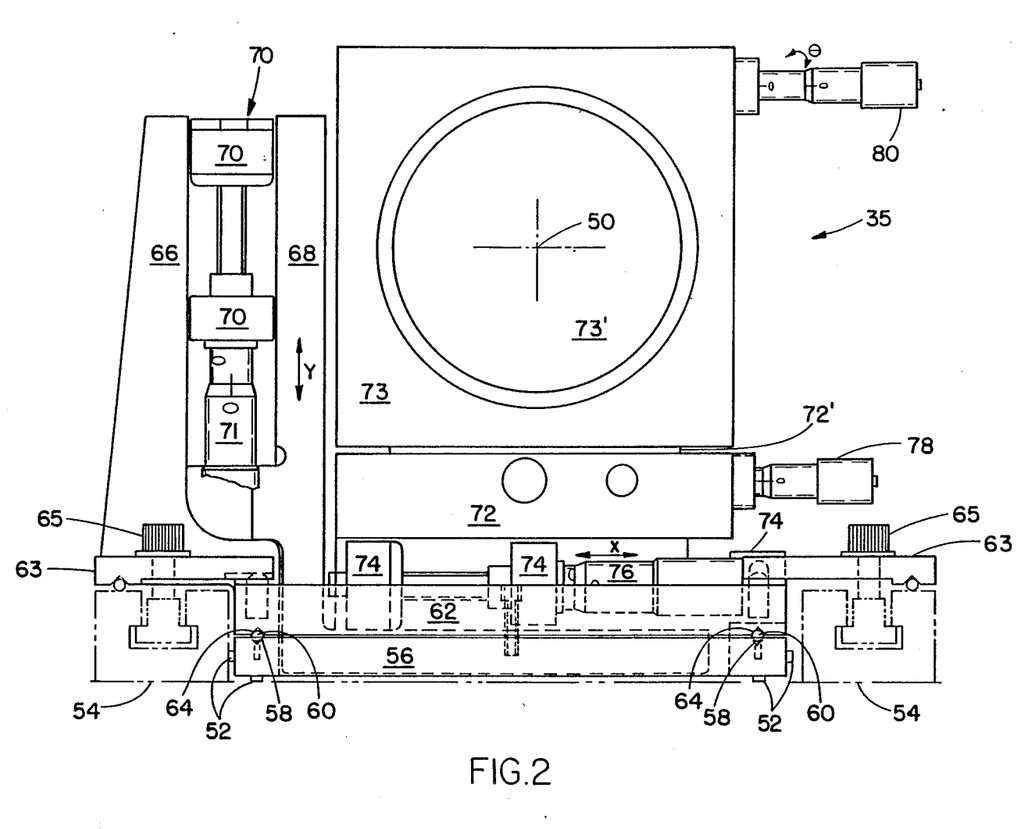
FIG. 2 is a front elevational view of a first exemplary embodiment of an alignment fixture for an optical correlator constructed pursuant to the teachings of the present invention.
Figure 3:
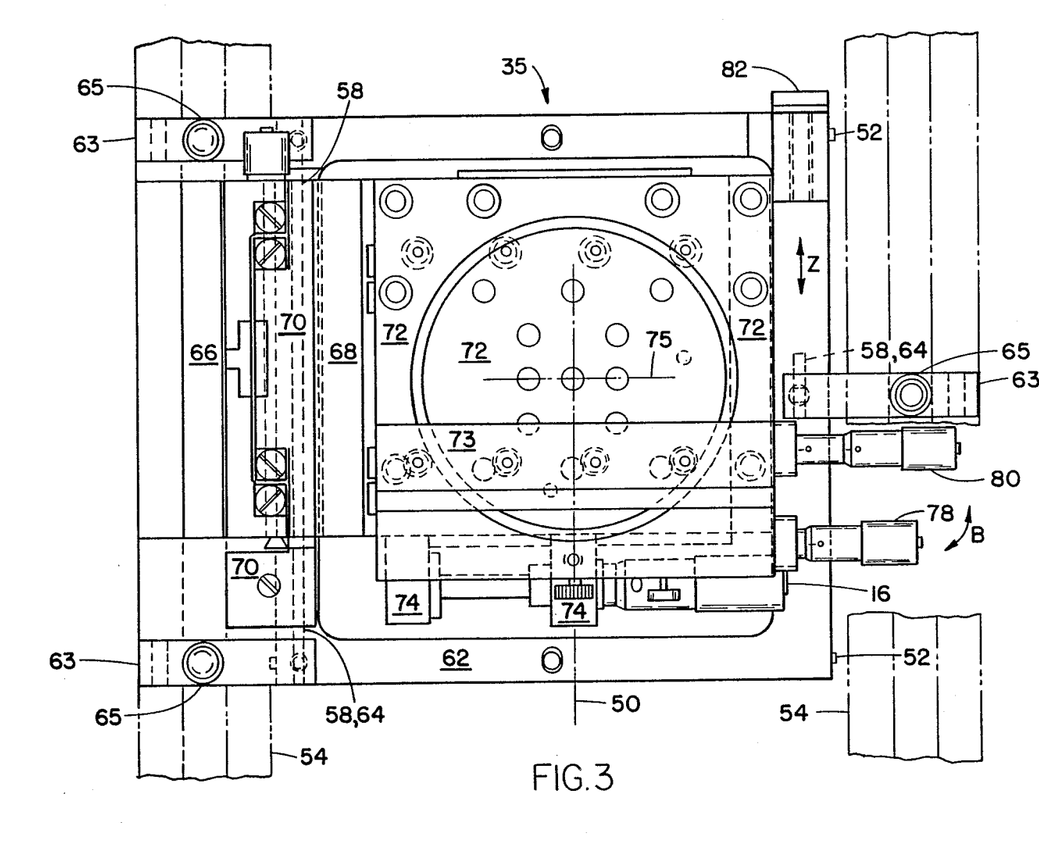
FIG. 3 illustrates a top plan view of the alignment fixture of FIG. 2.

FIGS. 2 and 3 are respectively a front elevational view and a top plan view of a first exemplary embodiment of the present invention for an alignment fixture for an optical correlator. The axially illustrated center line 50 is the optical axis of the matched filter assembly. Bosses 52 on the bottom and either side of the base represent aligning points widely used in optics laboratories to accurately locate this device (and others). The aligning rails 54 have "lazy C" cross sections shown in the lower left and right.

The matched filter plate 34 is located normal to the optical axis 50, and is usually subject to roll ($\theta$), and to transverse (x) and vertical (y) movements for correction 0 of its position for proper alignment. One criterion used in this correction is the maximization of the correlation signal which is measured and observed, for example, with a microscope in place of the detector 48 shown in FIG. 1. A scan line from a TV camera used for detector 48 could also serve for the required purpose. Whatever detection means is used, the plate is moved transversely (x), vertically (y) and rotationally ($\theta$) by micrometer movements for the critical alignment adjustments.

The alignment fixture is formed with a slide plate 56 which is mounted on the stabilized optical bench. The slide plate 56 is provided with alignment bosses 52 on the bottom and either side thereof to provide an initial alignment relative to a reference base provided by the aligning rails 54 provided on the top of an optical bench on which the optical correlator is mounted. The top of the base slide plate is provided with several upwardly facing precision V grooves 58 extending along the z axis (which is normal to the plane of the Figure), in which bearing rods 60 are mounted. A base plate 62 is provided with corresponding downwardly facing precision V grooves 64, such that the base plate 62 is movable thereon along the z axis for adjustment therealong. After an initial alignment along the z axis, several clamps 63 are tightened by set screws 65 to clamp the position of the base plate 62 relative to the aligning rails 54.

Figure 4:
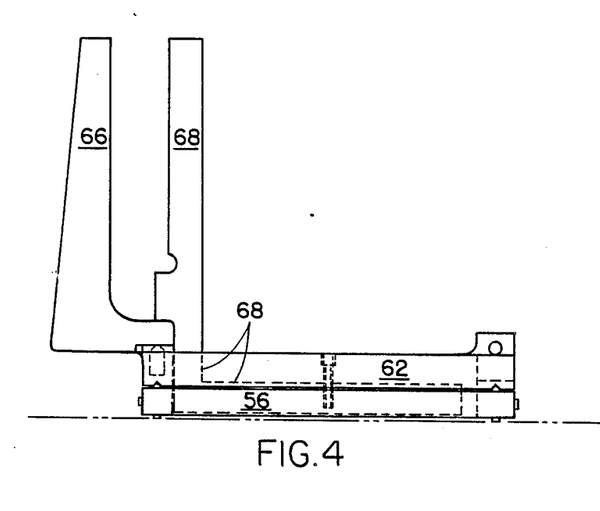
FIG. 4 is a front elevational view of a slide mount assembly of the alignment fixture, including a slide plate thereof and a base plate mounted thereon for translation along the z optical axis.
Figure 5:
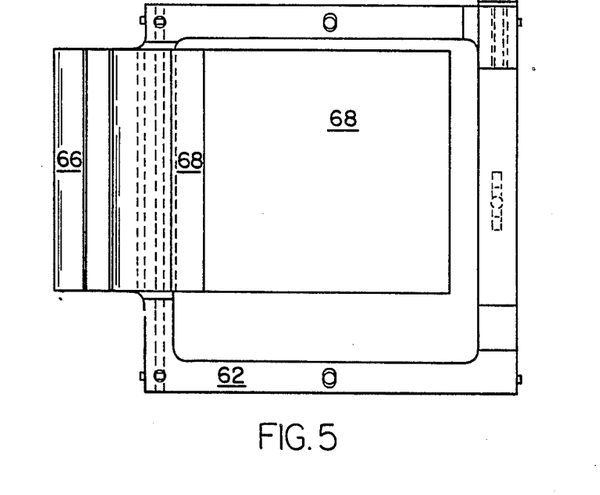
FIG. 5 is a top plan view of the slide mount assembly of FIG. 4.

The base plate 62 includes a vertically extending frame member 66. An L shaped lift angle plate 68 is vertically movably supported by a vertical Lansing translation stage assembly 70 by the vertically extending frame member 66 to provide for alignment adjustments along the y axis. FIGS. 4 and 5 are respectively a front elevational view and a top plan view of the slide mount assembly of the alignment fixture, illustrating the slide plate 56 thereof, the base plate 62 mounted thereon, and the L shaped lift angle plate 68.

Referring to FIGS. 2 and 3, a micrometer 71 adjustment is provided for accurate positioning along the y axis. A horizontal Lansing translation stage assembly 74 is mounted on the base of the L shaped lift angle plate 68, and provides for alignment adjustments along the horizontal x axis by a micrometer 76. The Lansing translation stage assemblies 70 and 74 are commercially available components, available from Lansing Research Corp., Ithaca, N.Y. The slide plate 56, base plate 62 and L shaped lift angle plate 68 are each preferably fabricated and machined from a single piece of stress relieved material such as aluminium to form an integral construction without welded or fastened seams therein for added structural stability.

A first rotational stage 72 is mounted on top of the movable portion of the Lansing translation stage 74, and a second rotational stage 73 is mounted on top of the first rotational stage 72 at a right angle relative thereto. The first and second rotational stages 72 and 73 are commercially available components, available from Newport Research Corp, Fountain Valley, Calif. Each rotational stage provides a base (72, 73) and a rotatable stage plate (72', 73') mounted in the base, thereby providing for rotational adjustments about a single axis. The first rotational stage 72 provides for yaw rotation about the y axis and the second rotational stage 73 provides for roll rotation about the z optical axis. Referring to FIG. 3, the second rotational stage 73 is positioned slightly forwardly on the first rotational stage, such that the element (photographic plate) mounted thereon for precise adjustment of alignment is positioned on the axis 75, FIG. 3. Angular adjustments for the element being aligned are provided for $\beta$ yaw by micrometer 78 and for $\theta$ roll by micrometer 80, as shown in FIG. 3.

In summary, for the three major alignment adjustments of y, x an $\theta$, a y translational drive system 71 provides for driving the L shaped lift angle plate 68 for y translational movements relative to the base plate 62. An x translational drive system 76 provides for driving the first rotational stage 72 for x translational movements relative to the L shaped lift angle plate 68. A $\theta$ rotational drive system 80 provides for driving the object for $\theta$ rotational movements about a z axis, perpendicular to the x and y axes, relative to the support base.

Additional alignments, although not common, can be provided by a z translational drive system 82 for driving the base plate relative to the slide plate for z translational movements (See FIG. 3), and the $\beta$ yaw rotational drive 78 for driving the object for $\beta$ yaw rotational movements about the y axis.

In a preferred embodiment, the x translational drive system, the y translational drive system, and the $\theta$ rotational drive system are each preferably formed by a pulse driven motor micrometer, and a computer control system supplies driving pulses to each pulse driven motor micrometer.

The manual micrometers can, and are in automated versions of the present invention, replaced by computer controlled versions, known by one manufacturer as "motor mikes". These units can control linear motion to 0.02 micrometer accuracy by pulses, such as those available from a DEC PDP-11 MINC-11 minicomputer, used to drive a stepper motor.

One advantageous feature of the present invention is the use of precision ways, 58, 60, 64. The continuous rod support for the z axis adjustment offers smooth, precise travel with no deviation in x or y positioning. This method of translation using a matched V-groove set is a low profile alternative to a ball-type slide mount assembly.

The assembled design of the alignment fixture is unique in that the slide plate 56, base plate 62 and lift angle plate 68 are each machined from a unitary block of stress relieved material. This one-piece construction eliminates welded or fastened seams that may weaken or develop flaws and thereby cause variations in the previously established settings. This design eliminates several subassemblies, and allows for the incorporation of "one-time" adjustments which can be set and permanently locked.

Figure 6:
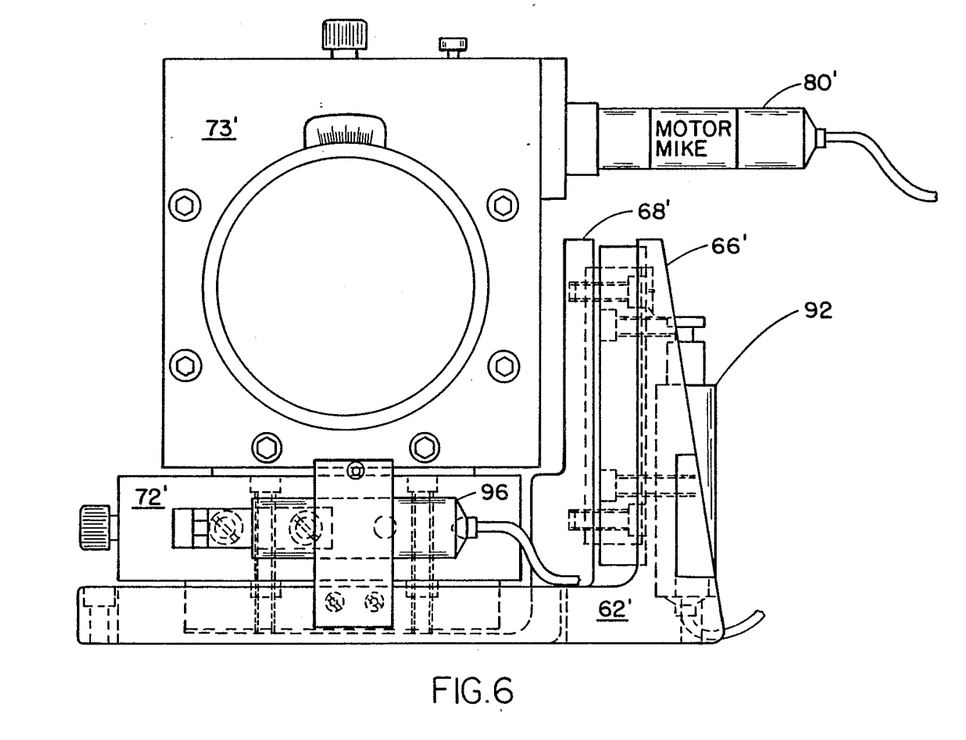
FIG. 6 is a front elevational view of a second exemplary embodiment of an alignment fixture for an optical correlator constructed pursuant to the teachings of the present invention.
Figure 7:
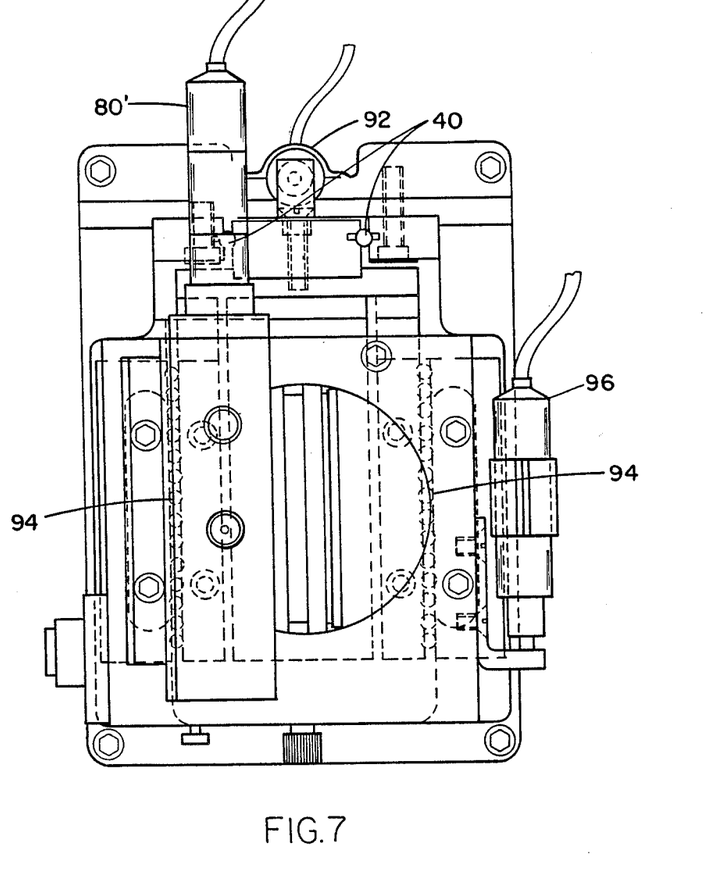
FIG. 7 is a top plan view of the alignment fixture of FIG. 6.
Figure 8:
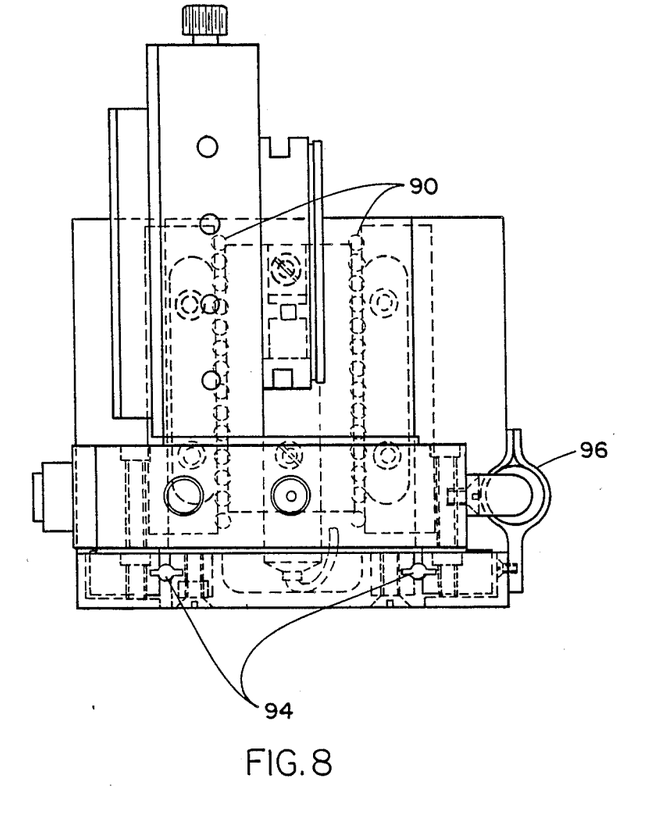
FIG. 8 is a left elevational view of the alignment fixture of FIG. 6.

FIGS. 6, 7 and 8 are respectively a front elevational view, a top plan view, and a left side elevational view of a second exemplary embodiment of an alignment fixture constructed pursuant to the teachings of the present invention.

This second embodiment is similar in design to the first embodiment, but differs therefrom in several respects. The structural elements of the second embodiment which are similar to those of the first embodiment are designated by the same reference numeral with a prime (') notation. In this second embodiment, the vertically extending frame member 66' and the L-shaped lift plate 68' are mounted on the right side, rather than the left side, of the alignment fixture, as in the first embodiment.

Moreover, the Lansing translation stage assemblies of the first embodiment are replaced by Schneeburger recirculating bearings and rail assemblies. The y vertical translational support is provided by Schneeburger recirculating bearings and a single rail assembly 90 and a vertical motor micrometer 92. The x horizontal translational support is provided by Schneeburger recirculating bearings and a double rail assembly 94 and a horizontal motor micrometer 96. The Schneeburger recirculating bearings and rail assemblies are commercially available components, available from Schneeburger, Inc., Bedford, Mass. 01730.

The automatic alignment fixture of the present invention provides the ability to swiftly and accurately align a key element in an optical correlator, i.e. the matched filter. The input signals are preferably derived from a computer, and cause the unit to move horizontally and/or vertically when a matched filter is to be made. For playback, the input drive signals are obtained from a determination of matched filter misalignments. For example, one matched filter record would contain one or more specific patterns or shapes, such that when illuminated with a focused laser beam, the light emerging from a pattern would be related to the extent of positional misalignment. In the playback phase, all degrees of freedom would be accessible for alignment.

While several embodiments and variations of the present invention for an alignment fixture for an optical instrument are described in detail herein, it should be apparent that the disclosure and teachings of the present invention will suggest many alternative designs to those skilled in the art.

What is claimed is:

1. An alignment fixture providing for alignment of an optical element in an optical instrument along three substantially transverse x, y, and z axes, wherein the z axis is along the optical axis of the instrument, and also rotationally in yaw about the y axis, and rotationally in roll about the z optical axis, comprising:

a. a slide plate forming a base for the alignment fixture and having alignment references thereon for aligning the slide plate relative to a reference base on which the slide plate is mounted;

b. a base plate mounted on said slide plate for precise translational movements of the base plate along the z optical axis relative to said slide plate, and is fixedly mounted to said slide plate with respect to translational movements along the x and y axes;

c. a lift plate mounted on said base plate for precise translational movement of the lift plate along the y axis relative to said base plate, and is fixedly mounted to said base plate with respect to translational movements along the x and z axes;

d. a first rotational stage, comprising a first stage base and a first stage plate mounted for precise rotational movement relative to said first stage base, said first rotational stage is mounted on said lift plate for precise translational movement of the first rotational stage along the x axis relative to said lift plate and is fixedly mounted to said lift plate with respect to translational movements along the y and z axes, said first stage plate also providing for precise yaw rotational movement about the y axis relative to said first stage base;

e. a second rotational stage, comprising a second stage base and a second stage plate mounted for precise rotational movement relative to said second stage base, said second rotational stage is mounted on said first stage plate, and said second stage plate providing for precise roll rotational movement about the z optical axis relative to said first stage plate.

2. An alignment fixture providing for alignment of an element, as claimed in claim 1, wherein said lift plate is mounted on said base plate by a translational slide assembly, and said first rotational stage is mounted on said lift plate by a translational slide assembly.

3. An alignment fixture providing for alignment of an element, as claimed in claim 1, wherein said lift plate is mounted on said base plate by a recirculating bearing and rail assembly, and said first rotational stage is mounted on said lift plate by a recirculating bearing and rail assembly.

4. An alignment fixture providing for alignment of an element, as claimed in claim 1, wherein said first rotational stage includes a micrometer x translational drive means, said lift plate includes a micrometer y translational drive means and said second rotational stage includes a micrometer roll rotational drive means.

5. An alignment fixture providing for alignment of an element, as claimed in claim 4, wherein said micrometer x translational drive means, said lift plate micrometer y translational drive means, and said micrometer roll rotational drive means each include a pulse driven motor micrometer.

6. An alignment fixture providing for alignment of an element, as claimed in claim 5, further including a computer control means for supplying driving pulses to each pulse driven motor micrometer.

* * * * *